United States Patent
Abivin et al.

(10) Patent No.: US 12,241,023 B2
(45) Date of Patent: *Mar. 4, 2025

(54) IN-SITU COMPOSITE POLYMERIC STRUCTURES FOR FAR-FIELD DIVERSION DURING HYDRAULIC FRACTURING

(71) Applicant: SCHLUMBERGER TECHNOLOGY CORPORATION, Sugar Land, TX (US)

(72) Inventors: Patrice Abivin, Houston, TX (US); Konstantin Viktorovich Vidma, Sugar Land, TX (US); Wai Sum Wilson Yip, Houston, TX (US); John W. Still, Katy, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/623,159

(22) Filed: Apr. 1, 2024

(65) Prior Publication Data

US 2024/0247183 A1    Jul. 25, 2024

Related U.S. Application Data

(63) Continuation of application No. 17/754,860, filed as application No. PCT/US2020/055205 on Oct. 12, 2020, now Pat. No. 11,981,865.

(Continued)

(51) Int. Cl.
*C09K 8/80* (2006.01)
*C09K 8/88* (2006.01)

(52) U.S. Cl.
CPC .............. *C09K 8/805* (2013.01); *C09K 8/887* (2013.01); *C09K 2208/08* (2013.01)

(58) Field of Classification Search
CPC . C09K 8/805; C09K 8/80; C09K 8/62; C09K 8/60; C09K 8/887; C09K 2208/08; E21B 43/26; E21B 43/267
See application file for complete search history.

(56) References Cited

U.S. PATENT DOCUMENTS 7,833,950 B2 * 11/2010 Willberg .................. C09K 8/80
                                                         166/305.1
10,077,396 B2    9/2018 Nguyen et al.
(Continued)

FOREIGN PATENT DOCUMENTS

WO         2009088317          7/2009
WO    WO-2009088317 A1 *  7/2009  ............... C09K 8/80
(Continued)

OTHER PUBLICATIONS

Search Report and Written Opinion of International Patent Application No. PCT/US2020/055205 on Jan. 15, 2021; 8 pages.

*Primary Examiner* — Angela M DiTrani Leff
(74) *Attorney, Agent, or Firm* — Jeffrey D. Frantz (57) ABSTRACT

Methods include pumping a fracturing pad fluid into a subterranean formation under conditions of sufficient rate and pressure to create at least one fracture in the subterranean formation, the fracturing pad fluid including a carrier fluid and a plurality of bridging particles, the bridging particles forming a bridge in a fracture tip of a far field region of the formation. Methods further include forming a first plurality of fibers in situ into the subterranean formation to form a low permeability plug with the bridging particles, and pumping a proppant fluid comprising a plurality of proppant particles.

20 Claims, 10 Drawing Sheets

Related U.S. Application Data (60) Provisional application No. 62/916,956, filed on Oct. 18, 2019.

(56) References Cited

U.S. PATENT DOCUMENTS

| | | | |
|---|---|---|---|
| 10,113,396 B2* | 10/2018 | Nelson | E21B 33/134 |
| 11,859,478 B2* | 1/2024 | Ye | C09K 8/5083 |
| 11,981,865 B2* | 5/2024 | Abivin | C09K 8/80 |
| 2004/0014608 A1* | 1/2004 | Nguyen | C09K 8/80 |
| | | | 507/200 |
| 2010/0303415 A1 | 12/2010 | Hamner et al. | |
| 2011/0272159 A1 | 11/2011 | Osiptsov et al. | |
| 2011/0303415 A1 | 12/2011 | Todd et al. | |
| 2013/0048283 A1* | 2/2013 | Makarychev-Mikhailov | |
| | | | C09K 8/68 |
| | | | 166/280.2 |
| 2013/0056213 A1* | 3/2013 | Medvedev | C09K 8/685 |
| | | | 166/308.5 |
| 2013/0233545 A1* | 9/2013 | Mahoney | E21B 43/267 |
| | | | 507/221 |
| 2015/0027702 A1* | 1/2015 | Godoy-Vargas | C09K 8/512 |
| | | | 507/224 |
| 2015/0060072 A1 | 3/2015 | Busby et al. | |
| 2016/0061017 A1* | 3/2016 | Nguyen | C09K 8/57 |
| | | | 166/280.2 |
| 2016/0122618 A1* | 5/2016 | Nguyen | C04B 28/021 |
| | | | 507/104 |
| 2016/0280983 A1* | 9/2016 | Zamora | C09K 8/516 |
| 2016/0340573 A1 | 11/2016 | Semenov et al. | |
| 2018/0002596 A1 | 1/2018 | Godoy-Vargas et al. | |
| 2018/0135399 A1* | 5/2018 | Semenov | C09K 8/88 |
| 2018/0149008 A1 | 5/2018 | Nguyen et al. | |
| 2021/0024807 A1 | 1/2021 | Vidma et al. | |
| 2021/0062074 A1* | 3/2021 | Eoff | C09K 8/62 |

FOREIGN PATENT DOCUMENTS

| | | | |
|---|---|---|---|
| WO | 2016130298 | 8/2016 | |
| WO | WO-2016130298 A1 * | 8/2016 | C09K 8/68 |
| WO | 2018118014 | 6/2018 | |
| WO | WO-2018118014 A1 * | 6/2018 | B33Y 70/00 |
| WO | 2019195478 A1 | 10/2019 | |

* cited by examiner

IN-SITU COMPOSITE POLYMERIC STRUCTURES FOR FAR-FIELD DIVERSION DURING HYDRAULIC FRACTURING

PRIORITY

This application is a continuation of U.S. patent application Ser. No. 17/754,860, filed on Apr. 14, 2022, which was a National Stage Entry of International Patent Application No. PCT/US2020/055205, filed on Oct. 12, 2020, which claims the benefit of U.S. Provisional Patent Application No. 62/916,956, filed on Oct. 18, 2019. Each of the above applications is incorporated herein by reference in its entirety.

BACKGROUND

Hydrocarbons (oil, natural gas, etc.) are obtained from a subterranean geologic formation (i.e., a "reservoir") by drilling a wellbore that penetrates the hydrocarbon-bearing formation. This provides a partial flowpath for the hydrocarbon to reach the surface. In order for the hydrocarbon to be "produced," that is travel from the formation to the wellbore (and ultimately to the surface), there is a sufficiently unimpeded flowpath from the formation to the wellbore.

Hydraulic fracturing, also referred to as fracking, is an oilfield operation which is performed to stimulate a well and to increase well productivity and/or injectivity.

Typically, it includes stages of pumping a fluid into a subterranean formation at a pressure which is sufficient to crack the formation and create or extend fractures or channels from the wellbore into the reservoir. The fracturing fluid propagates through the fractures leading to their geometrical growth. Fluids used in hydraulic fracturing may include, among other components, propping granules or proppants which may enhance the hydrocarbon production capabilities of the earth formation. During the fracturing treatment, the proppants may accumulate inside the fracture and may act as supporting materials that prevent the fractures from closing after the end of the treatment, providing high conductivity flow paths from the formation to the wellbore during well production and injection.

However, during some hydraulic fracturing treatments, vertical and/or horizontal growth of an induced fracture may occur, and the fracture may grow out of the target formation to be treated. Therefore, it may be advantageous to confine the induced fracture to the particular formation being treated by restricting the fracture length L and/or the fracture height H. For example, one situation is the case of closely drilled wells. Operators may drill the wells very close to each other. Such wells can be vertical, horizontal or deviated. Spacing between the wells can be as short as several hundred feet. Hydraulic fracturing treatments in such wells may result in a fracture that may intersect fracture(s) belonging to other wells, or may even invade other wells. This may be an undesirable effect; therefore, controlling the growth of fracture length or height (depending on the mutual position of the wells) may be desired. Another situation when restriction of fracture growth may be beneficial is directed to controlling fracture height in order to prevent treating zones above or below the target zone. For example, a production zone may have another zone above or below, and treating that zone may not be desirable. Thus, in such case, height control may be desirable to contain the fracture inside the production zone.

There are also benefits of complexity versus fracture length. Shales are formations having very low matrix permeability, with many natural fractures and high rock heterogeneity. For hydraulic fracturing in such formations, it is often more beneficial to create a developed complex network of interconnected fractures, rather than to create long and high single fractures. Such complexity may be achieved by restricting growth of the main fracture, thus diverting the fluid to open up and connect natural fractures.

SUMMARY

In an aspect, embodiments relate to methods. A pad fluid is pumped into a wellbore traversing a subterranean formation at sufficient pump rate and pressure to create at least one fracture in the subterranean formation. The pad fluid comprises a carrier fluid and a plurality of bridging particles. The bridging particles form a bridge at the tip of the fracture with the far-field region of the subterranean formation. A second treatment fluid comprising one or more polymers is pumped into the formation. At least one treatment-fluid parameter is adjusted, causing the one or more polymers to form a first plurality of fibers in situ. The first plurality of fibers forms a low-permeability plug with the bridging particles. A proppant fluid is then pumped that comprises a plurality of proppant particles.

DETAILED DESCRIPTION

At the outset, it should be noted that in the development of any such actual embodiment, numerous implementations—specific decisions must be made to achieve the developer's specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that inventors appreciate and understand that any and all data points within the range are to be considered to have been specified, and that inventors possessed knowledge of the entire range and all points within the range.

Generally, embodiments disclosed herein relate to stimulation treatments for improving well performance and recovery of hydrocarbons in subterranean formations. More specifically, embodiments disclosed herein relate to methods for restricting the growth of one or more fractures formed in a far field region during a hydraulic fracturing treatment, the method comprising pumping a treatment fluid comprising one or more polymers into the subterranean formation, in conjunction with a plurality of bridging particles. At least one parameter of the treatment fluid is adjusted, causing the one or more polymers to form a first plurality of fibers in situ. The first plurality of fibers used in conjunction with the plurality of bridging particles may act as far field diverting agents that are capable of bridging narrow portions of a fracture tip such as those encountered during hydraulic fracturing operations. Upon bridging, these diverting materials may form a low permeability plug that may allow for a better control of the fracture by restricting the growth of a fracture height and/or length. Without being bound by any theory, it is believed that the fibers formed in situ may assist the transport of the bridging materials and may reduce the permeability of a diversion pack after the bridging particles accumulate at a narrow fracture tip, leading to fracture containment or far field diversion.

As defined herein, a zone refers to an interval of rock along a wellbore that is differentiated from surrounding rocks based on hydrocarbon content or other features, such as perforations or other fluid communication with the wellbore, faults, or fractures. The near-wellbore region of a zone is considered to include the matrix of the rock within a few inches of the borehole. For this disclosure, the near-wellbore region of a zone is considered to be anywhere within about 12 inches extending radially from the wellbore. The far field region of a zone is considered to be the matrix of the rock that may be beyond the near-wellbore region—that is, further than 12 inches. In one or more particular embodiments, the far field region that is treated by the present methods may be further than 36, 60 or 120 inches from the wellbore.

In a fracturing method applied to a subterranean formation, a first stage referred to as the "pad stage" involves injecting a fracturing fluid (commonly called the "pad fluid") into a wellbore at a sufficiently high flow rate and pressure to create at least one fracture in the subterranean formation. The pad stage is pumped until the fracture has achieved sufficient dimensions for efficient stimulation of the target formation. After the pad stage, several stages referred to as "proppant stages" or "propped stages" may be injected into the formation, in which solid proppant particles are suspended in the fluid. While conventional fracturing techniques may include the continuous introduction of proppants, embodiments may also include the periodic introduction of proppants also known as "pulse fracturing." Pulse fracturing is a technique practiced by Schlumberger under the trademark HIWAY.

Figure 1:
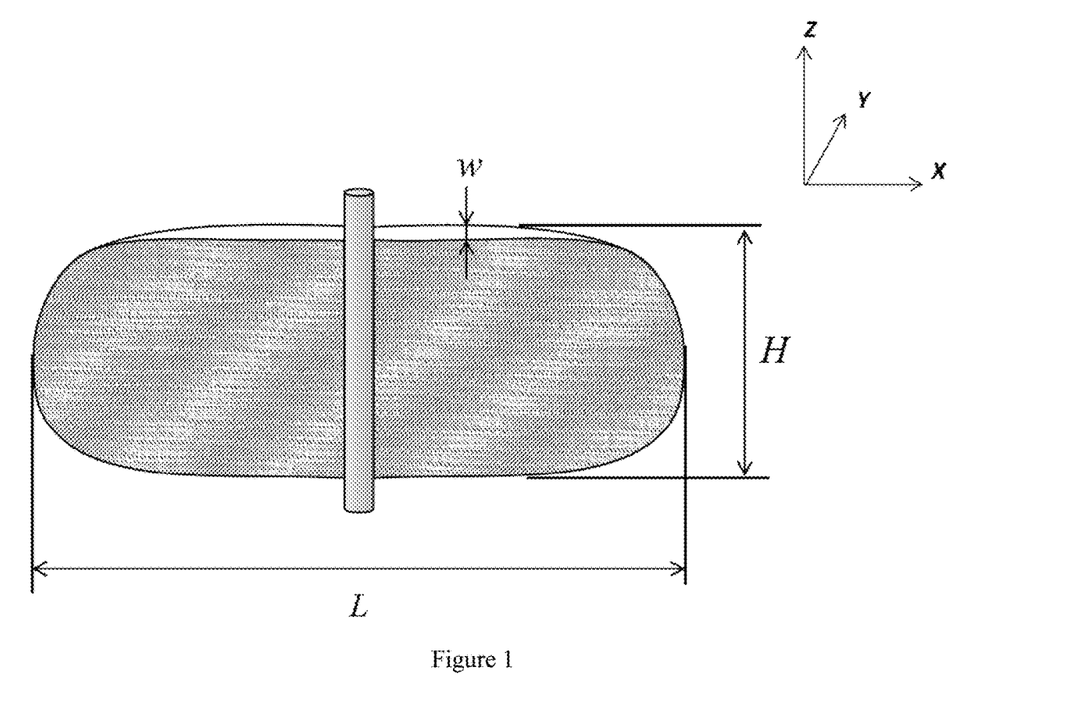
FIGS. 1 and 2 illustrate examples of geometries of a plane fracture in a well according to the present embodiments.
Figure 2:
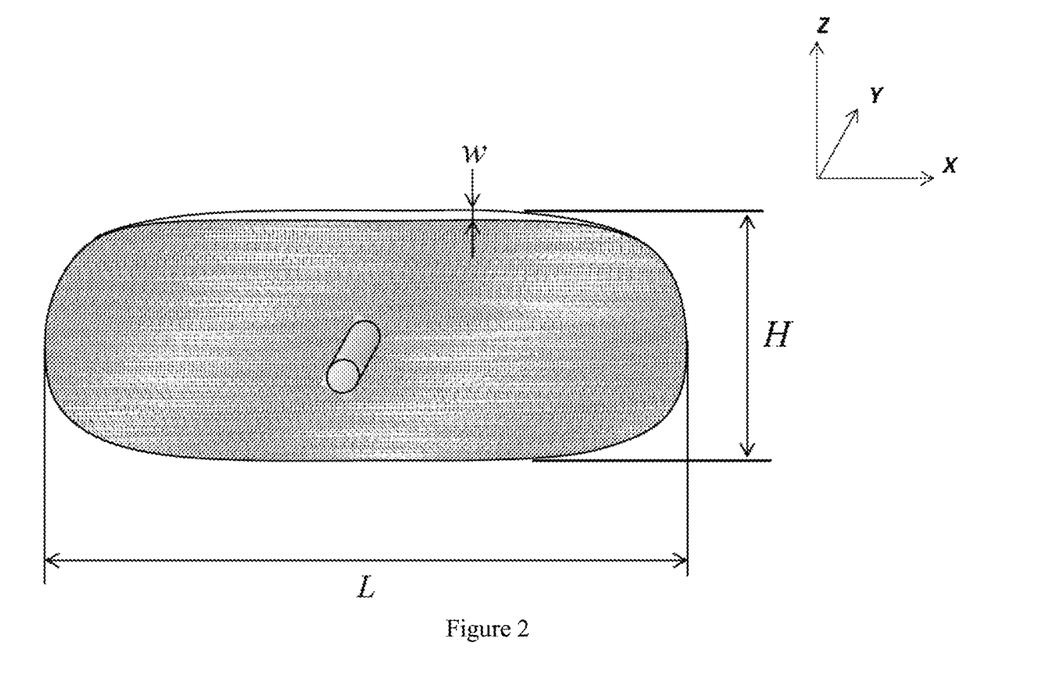

The geometry of a fracture formed during a hydraulic fracturing treatment may be very complex. For example, fractures may have tortuosity, non-planar non-symmetrical shapes, or may have complex multiple wing structures. However, for simplicity reasons, it is considered that a fracture may be described as a single plane fracture that is defined as seen in FIGS. 1 and 2 by length, L, height, H and width, w. Referring now to FIGS. 1 and 2, examples of geometries of plane fractures are depicted. For example, FIG. 1 depicts a planar fracture in a vertical well, while FIG. 2 depicts a planar fracture in a horizontal well.

Fracture growth during a hydraulic fracturing treatment, and final fracture geometry after the end of the treatment, are defined by mechanical laws and may depend on many parameters including distribution and anisotropy of mechanical stresses in the reservoir, reservoir pore pressure, formation leak-off properties, reservoir structure, pumping fluid pressure, flowrate, viscosity, and concentration and properties of solid particles.

According to the present embodiments, control of fracture geometry may be accomplished by stopping fracture tip propagation. This may be accomplished by placing a pad slurry that includes at least a diverting material suspended in a carrier fluid near a fracture tip. The pad slurry may comprise the first plurality of fibers formed in situ, such that the first plurality of fibers is commingled with the bridging particles to form a bridge. The first plurality of fibers formed in situ may also be pumped sequentially after the bridging particles such that the first plurality of fibers forms a deposit on the bridge. The pad slurry may have a viscosity of at least 4 cP at a shear rate of 511 $s^{-1}$.

Figure 5:
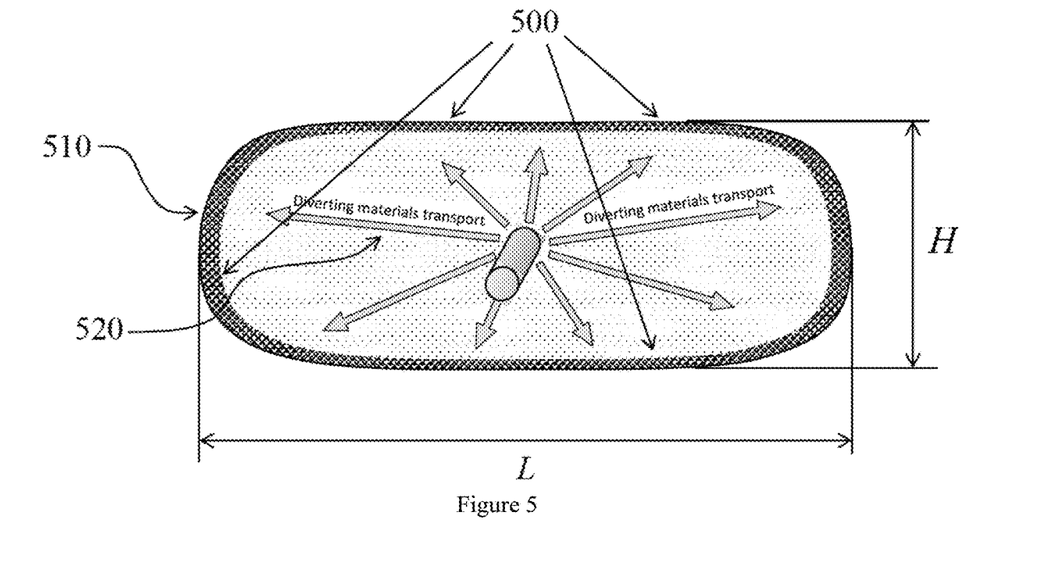
Figure 6:
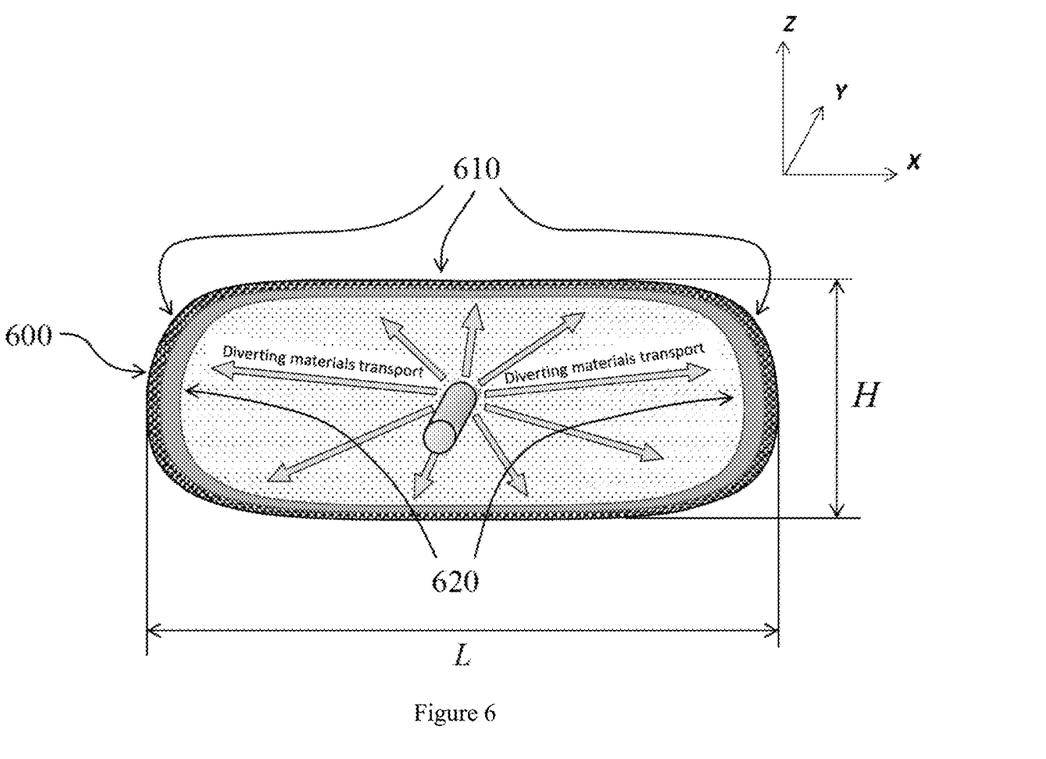
FIGS. 6-7 depict placement of two diverting materials according to the present embodiments.

The diverting material may provide sufficient hydraulic resistance to the fluid, which otherwise would move fracture tip forward, as depicted in FIGS. 5 and 6, for example, and described later in greater detail. The far field diverting material may form a bridge with the formation of a plug at the fracture tip, controlling or restricting the growth of fracture length and/or fracture height. Then, one or more proppant stages may be injected into the far field region until a fracture network forms. As will be described later in greater detail, the diverting material may be placed uniformly or non-uniformly in the far field region depending on the direction of the growth restriction.

At least one of the one or more polymers may be an organic polymer. The one or more polymers may be natural polymers, synthetic polymers, polyelectrolytes or biopolymers (or derivatives thereof) or mixtures thereof that comprise a crosslinkable moiety, for example, substituted galactomannans, guar gums, high-molecular weight polysaccharides composed of mannose and galactose sugars, or guar derivatives, such as hydrophobically modified guars, guar-containing compounds, and synthetic polymers. Suitable polymer chemical entities may comprise a guar gum, a locust bean gum, a tara gum, a honey locust gum, a tamarind gum, a karaya gum, an arabic gum, a ghatti gum, a tragacanth gum, a carrageenen, a succinoglycan, a xanthan, a diutan, scleroglucan, alginates, a hydroxyethyl guar, a hydroxypropyl guar (HPG), a carboxymethylhydroxyethyl guar, a carboxymethylhydroxypropyl guar (CMHPG), polyanionic cellulose (PAC), a carboxyalkyl cellulose, such as carboxymethyl cellulose (CMC) or carboxyethyl cellulose, an alkylcarboxyalkyl cellulose, an alkyl cellulose, an alkylhydroxyalkyl cellulose, a carboxyalkyl cellulose ether, a hydroxyethylcellulose (HEC), hydroxypropylcellulose (HPC), a carboxymethylhydroxyethyl cellulose (CMHEC), a carboxymethyl starch, a copolymer of 2-acrylamido-2methyl-propane sulfonic acid and acrylamide, a terpolymer of 2-acrylamido-2methyl-propane sulfonic acid, acrylic acid, acrylamide, or derivative thereof. The polymer may be a cationic polymer such as chitosan, cationic guar, gelatin, collagen, or other polypeptide, polyethyleneimine (PEI), diallyldimethylammonium chloride (DADMAC), polyvinyl pyrrolidone (PVP), polyvinylamine (PVA), or other polyamine. The polymer may also be a synthetic polymer such as, for example, a polyacrylamide including partially hydrolyzed polyacrylamide (PHPA); polyvinyl alcohol; polyethylene glycol; polypropylene glycol; polyacrylic acid or polymethacrylic acid; as well as copolymers and mixtures thereof.

In embodiments, the one or more polymers may be present in the treatment fluid at a concentration between about 0.01% to about 4.0% by weight of the treatment fluid.

In embodiments, the one or more polymers may be modified to include carboxylic acid groups, thiol groups, paraffin groups, silane groups, sulfuric acid groups, acetoacetylate groups, polyethylene oxide groups, and/or quaternary amine groups. Such modifications may be used to influence one or more properties of the polymer, which may be used to adjust the solubilization and/or consolidation properties of the polymer. For example, such modifications may be used to modify the one or more polymer's sensitivity to salinity, pH, ionic strength and/or solvent compositions. Such modifications may also introduce crosslinking functionalities (such as hydroxyl groups and silanol groups, which are chelates that can crosslink with common crosslinkers). Conventional methods of making such modifications are known.

According to the present embodiments, the at least one parameter being adjusted may comprise temperature of the treatment fluid, an ionic concentration of the treatment fluid, a pH of the treatment fluid, exposure to shear, a hydrophobicity of the one of more polymers, a solvent composition of the treatment fluid, a crosslinking of the one or more polymers and an average molecular weight of the one of more polymers, or a combination thereof.

The at least one parameter may be adjusted at the surface of the wellbore before the treatment fluid is placed into the wellbore. Or, the at least one parameter may be adjusted within the wellbore to consolidate the one or more polymers after the treatment fluid has been placed into the wellbore. Exposing the treatment fluid to a shear event and causing the formation of the composite polymeric structure may also take place at the surface of wellbore before the treatment fluid is placed into the wellbore, or the shear event may take place at one or more subterranean locations. The subterranean locations may be within the wellbore or within the subterranean formation. During the shear event, the treatment fluid may be exposed to a shear rate between about 1 $s^{-1}$ and 100,000 $s^{-1}$.

The one or more polymers may be added to the treatment fluid at an underground location within the wellbore.

The one or more polymers may comprise at least one pH-sensitive polymer. Such pH-sensitive polymers may include (but not be limited to) alginates, chitosan, cellulose acetate phthalate, cellulose acetate trimellitate, hydroxypropylmethylcellulose pthtalate, polyacrylic acid, poly(methyl methacryate) copolymers, polyamines and shellac. Examples of polymer classes that may be mixed with pH-sensitive polymers include neutral polysaccharaides, polyethers, polyacetals, polyamides and polyesters. In such situations, the treatment fluid may be placed into the subterranean formation at a pH effective to inhibit consolidation of the polymer in the subterranean formation. A first pH adjustment may shift the treatment fluid to a pH that is effective to induce consolidation of at least one of the one or more polymers in the subterranean formation. The first pH adjustment may cause the treatment fluid pH to change by at least one pH unit. A second pH adjustment may be performed after the treatment fluid is placed into the subterranean formation. The second pH adjustment may be effective to reverse the one or more polymers in the subterranean formation.

The one or more polymers may comprise at least one crosslinkable polymer. The one or more polymers may consolidate as a result of a crosslinking reaction, thereby forming a crosslinked polymer. The crosslinkable polymer may comprise a polysaccharide or a polyelectrolyte, and may be crosslinked by divalent cations, polyvalent cations, calcium, magnesium, copper, chromium, iron, boron, aluminum, titanium or zirconium, or combinations thereof.

The treatment fluid may comprise at least two oppositely charged polyelectrolyte polymers, which consolidate to form a polyelectrolyte complex.

The treatment fluid may comprise one or more polymers comprising at least one polyelectrolyte polymer and at least one oppositely charged surfactant. The at least one polyelectrolyte polymer may comprise polyacrylamide.

The disclosed methods may further comprise contacting the one or more polymers with an additional treatment fluid that changes the salinity or the ionic concentration of the treatment fluid, thereby consolidating the one or more polymers into the at least one composite polymeric structure. The polyelectrolyte complex may also be dissolved or degraded by contacting saline formation water.

During the fracturing treatment, the release of at least one polymer may be delayed. The delay may be accomplished by encapsulating the at least one polymer or delivering the at least one polymer downhole in solid form. Or, the at least one polymer may be present as a coating on the surface of the bridging particles. The release of the at least one polymer may be triggered by time, temperature, pressure or mechanical stress.

The composite polymeric structure may also include the bridging particles. The composite polymeric structure may comprise an embedded-composite polymeric structure in which the bridging particles are embedded within the embedded composite polymeric structure. The bridging particles may be present in the composite polymeric structure in an amount between about 0.01% and 95% by weight, based on the total weight of the composite polymeric structure.

In embodiments, the fracturing pad fluid may further comprise a second plurality of fibers such that the second plurality of fibers are intermingled with the bridging particles to form a bridge on which the first plurality of fibers is deposited. The second plurality of fibers may be added a concentration between 0.1 and 600 ppt (pounds per thousand gallons added).

The second plurality of fibers may be cellulose fibers, cellulose derivative fibers or both. The second plurality of fibers may have an aspect ratio between 1.5 and 1000, and a length between 0.05 mm and 30 mm.

According to the present embodiments, the far field diverting material transport may include at least two diverting materials, such as bridging materials, suspended in a carrier fluid. In one or more embodiments, the bridging materials may be selected from the group of inert, non-deformable bridging particles, fibers and mixtures thereof. For example, in one or more embodiments, the far field diverting material may include one or more inert, non-deformable bridging particles and/or a plurality of fibers. In yet another embodiment, the far field diverting agent may include at least two bridging particles having a multimodal distribution and/or a plurality of fibers.

In embodiments of the present disclosure, the fibrous material may be generated by coalescing the at least one polymer from a polymer solution, thereby generating an aqueous suspension of polymer bodies. The polymer solution may be in motion (flowing) as the coalescence takes place. Motion may promote the formation of extended bodies (fiber-like) rather than a precipitate of uniform low-aspect-ratio particles. The polymer bodies may elongate, extend, or stretch in a high-velocity flow. In other embodiments, flow techniques may be used to produce other shapes of polymer structures such as discs, spheres, tubes and the like. Additional information may be found in U.S. patent Application No. 2018/0002596, which is incorporated herein in its entirety.

As described herein, using a plurality of fibers formed in situ may enable and enhance the bridging properties of the material. Various fiber materials including for example cellulose fibers may also be included to aid proppant transport and therefore, help the diversion material reach the far field portions of the fracture avoiding settling or premature bridging. For example, fibers may enable or help to keep the diversion material from spreading during the transport in the wellbore and in the fracture. The properties and the concentration of the fibers may be chosen in such a manner to provide bridging at a certain distance from the wellbore or a certain width of the fracture. For example, the size of the fibers may be selected to match the fracture width to effectively plug fractures of certain width. The bridging materials of the present disclosure may be designed to target a dominant direction of growth and therefore divert to contain rampant fracture height or length growth specifically.

Figure 3:
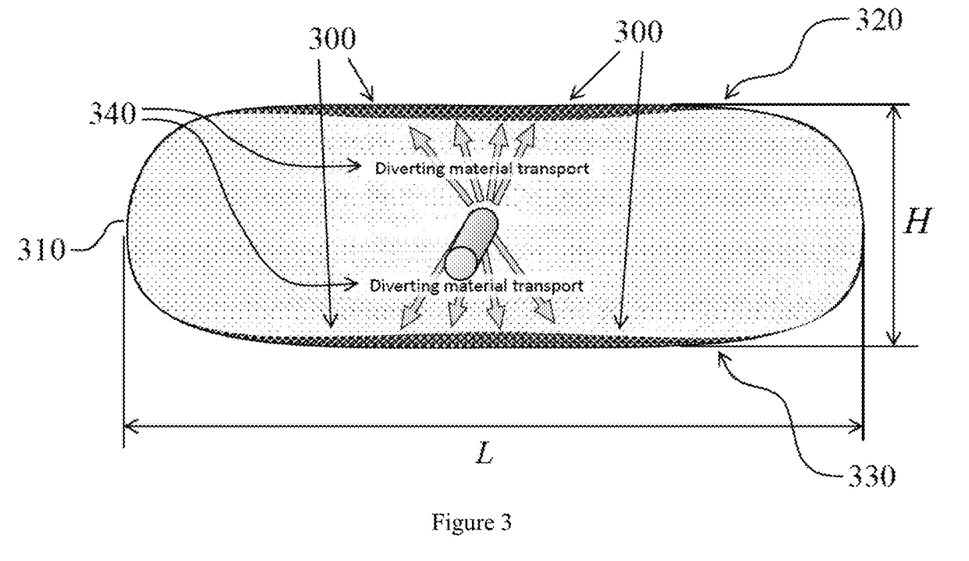
FIGS. 3-5 depict examples of placement of a bridging material according to the present embodiments.

The present disclosure may be used for height growth control which may keep the fracture contained to the hydrocarbon rich pay zones (as seen in FIG. 3) or keep the fracture length (FIG. 4) contained so that the fractures hit may be prevented in regions with closely spaced wellbore laterals. As described later in greater detail, it is also envisioned that the hydraulic fracturing method as described herein may be used for growth control of fracture height and fracture length. In such embodiments, the diverting material may be placed uniformly to all directions to provide both height and length control (FIG. 5).

Figure 7:
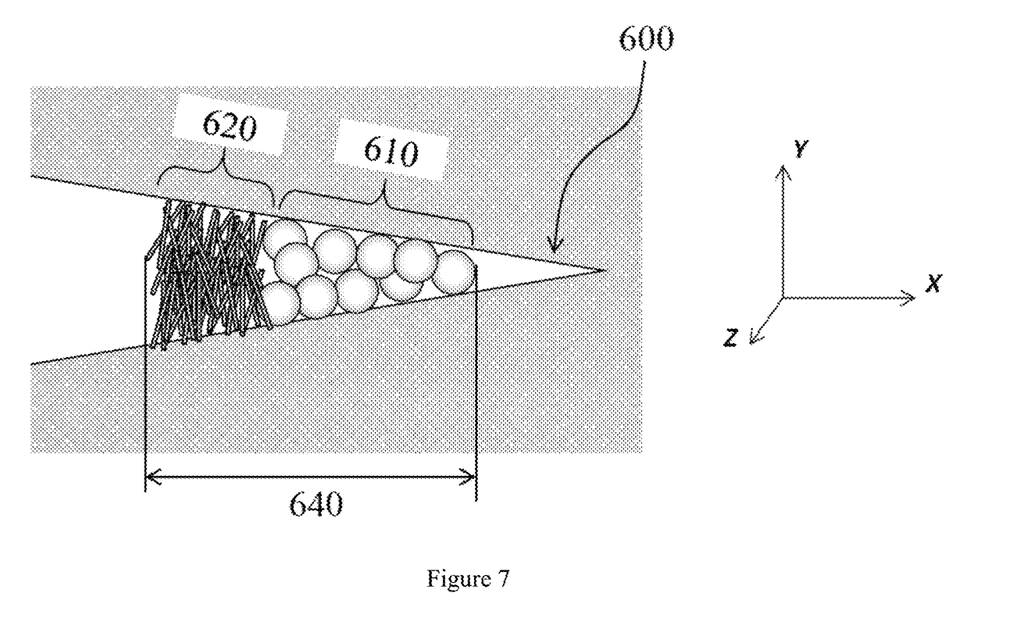
Figure 8:
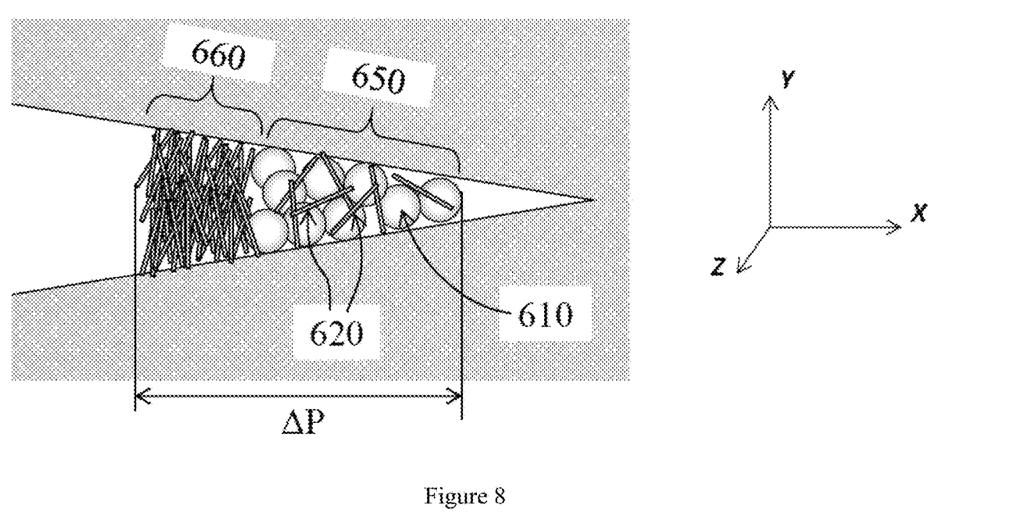
FIGS. 8 and 9 depict examples of placement of three diverting materials according to the present embodiments.

According to the present embodiments, controlling a fracture geometry involves the following stages: a) placement of a plugging slurry or pad fluid (such as a diverting material transport) that includes at least a diverting material (such as bridging materials) near the tip of a fracture as depicted in FIGS. 3-6; b) bridging of the bridging particles at the place where the fracture is sufficiently narrow, as seen for example in FIGS. 5-6; and c) accumulation of solid particles (such as fibers) starting at the place of bridging to form a plug of low permeability (as seen for example in FIGS. 6, 7 and 8). Without being bound by the theory, it is believed that if such a plug is deep enough and has a permeability that is low enough, the propagation of the fracture tip may be stopped due to massive energy losses to overcome the plug resistance. As noted above, it has been determined that the addition of a plurality of fibers to a plurality of bridging particles may enable or improve the efficiency of stages a) through c) described above. In addition, the fibers may provide a certain viscosity to the diverting material transport that may allow the bridging particles to reach the fracture tip. According to the present embodiments, the viscosity of the plugging slurry may be at least 4 cP at 511 $s^{-1}$. The far field diversion methods as described herein may be used for a first time fracturing operation, as well as for re-fracturing operations.

According to the present embodiments, the inert, non-deformable bridging particles may include proppants used in general in fracturing operations. According to the present embodiments, the proppant materials may be selected from, but are not limited to, ceramic proppants, sand, organic polymers, plastics and mixtures of thereof. The sizes of the particles may vary depending on the desired results of the fracturing treatment. However, in particular embodiments, the size of the diverting material bridging particles may be larger than the size of proppant(s) used in later stages to prop open the fractures. According to the present embodiments, the bridging particles may have a monomodal or a multimodal distribution. For example, in one or more embodiments, the diameter of the bridging particles may be between 0.1 and 10 mm. It is also envisioned that bimodal bridging particles may be used as well. In such embodiments, the size of the bridging particles may be $40/70$, or $30/50$, or $20/40$ or $16/30$ or $16/20$. The proppants as described herein may have a diameter in the range of 0.01 to 10 mm, where the lower limit can be any of 0.01 mm, 0.05 mm, 1 mm, 5 mm and the upper limit can be any of 5 mm, 7.5 mm or 10 mm, where any lower limit can be used with any upper limit. According to the present embodiments, concentration of the proppant may vary in the range of 0.01 to 10 ppa, where the lower limit can be any of 0.01, 0.05 ppa or 1 ppa and the upper limit can be any of 5 ppa, 7.5 ppa or 10 ppa, where any lower limit can be used with any upper limit. As defined herein, ppa is directed to pounds proppant added.

In one or more embodiments, the first bridging materials pumped in the first stage of the fracturing operation, as described above, may include large proppant particles. In such embodiments, the total amount of proppant placed during the first stage may be varied in the range of 100 lb to 100,000 lb. It is also contemplated that such first bridging materials may be pumped at any stage in the treatment.

In one or more embodiments, the fibers may be selected from the group of polymer fibers formed in situ. The fibers may further comprise cellulose fibers or cellulose derivatives fibers. Cellulose pulp, produced largely from sawmill residue and recycled paper as well as logs and chips, is a refined product that finds its primary applications in the paper industry. It is one of the most abundant raw materials on earth, and can be tailored to a specific application by varying the source material and processing stages to produce a wide variety of fibrous cellulose products. The pulp can be fractionated to give fibers of varying lengths (10 microns to 10 mm) and diameters (5-100 micron). According to the present embodiments, the cellulose fibers are dispersed in a carrier fluid, which, as defined herein, may be any fluid used in hydraulic fracturing. In one or more embodiments, the carrier fluid may be selected, but not limited to guar based linear or cross-linked gel, slick water, it can also be foam-based fluid or other water or oil-based fluids.

According to the present embodiments, the concentration of the fibers may range from 0.1 to 1000 ppt (ppt is a pound of fibers per thousand gallons of clean fluid, ppt=lb/1,000 US gal), where the lower limit can be any of 0.1 ppt, 0.5 ppt, 1 ppt, 5 ppt or 10 ppt and the upper limit can be any of 150 ppt, 500 ppt, 750 ppt or 1000 ppt, where any lower limit can be used with any upper limit. For example, the concentration of the fibers added in the first stage of the fracturing operation may range from 0.1 to 1500 ppt.

The fibers that have shown utility in the present disclosure may exhibit the following properties: a) have a fiber aspect ratio that ranges from 1.5 to 1000; b) the fiber length may range from about 0.05 mm to about 30 mm, or from 0.05 mm to about 10 mm, or from about 0.1 mm to about 30 mm; c) the diameter of the fibers may range from about 5 μm to about 100 μm, where the lower limit can be any of 5 μm, 10

μm, 20 μm and the upper limit can be any of 50 μm, 80 μm and 100 μm, where any lower limit can be used with any upper limit.

The placement of the bridging/plugging material may be governed by the viscosity of the carrying fluid. For instance, the viscosity may be designed so the diversion material settles at the bottom of the fracture to prevent further downward growth. In other embodiments, the viscosity may be designed to generate Saffman-Taylor instabilities in the fracture, in which a low viscosity fluid fingers through a higher viscosity fluid containing diversion material, so that the top and bottom of the fracture are contained. In other embodiments, the viscosity of the carrier fluid may be designed to carry the diversion material(s) to the tip of the fracture to prevent further growth and divert the flow in a different direction. Additional information concerning these techniques may be found in U.S. patent Application No. US 2011/0272159, which is incorporated herein in its entirety.

The amount of the fibers used in the fracturing treatment may vary, as described later in greater detail, depending on the stage of the fracturing treatment when they are introduced into the fracture. In one or more embodiments, the concentration of the fibers may range from 0.1 to 30% of the total mass of solid particles in the bridging materials. It is also envisioned that the total amount of fibers that are used during the fracturing operation may vary from about 100 to about 10000 lbs.

As described herein, the bridging particles and the fibers are dispersed in a carrier fluid. According to the present embodiments, the carrier fluid may be any fluid used for hydraulic fracturing.

The placement of a diverting material transport that includes at least a bridging material into a fracture is dictated by the desired direction of the growth restriction. For example, when control of the fracture height is desired, the diverting transport material may be placed predominantly at the top and bottom of the fracture, as shown in FIG. 3. Referring now to FIG. 3, a fracture 310 having a length L and a height H is illustrated. A diverting material transport 340 that includes at least a diverting material (such as a plurality of bridging particles) is placed non-uniformly near the top 320 and the bottom 330 of the fracture 310, in such a manner that the bridging material 300 included into the diverting material transport 340 may bridge at the top 320 and the bottom 330 tip of the fracture restricting this way the growth of the fracture along its height, H.

Figure 4:
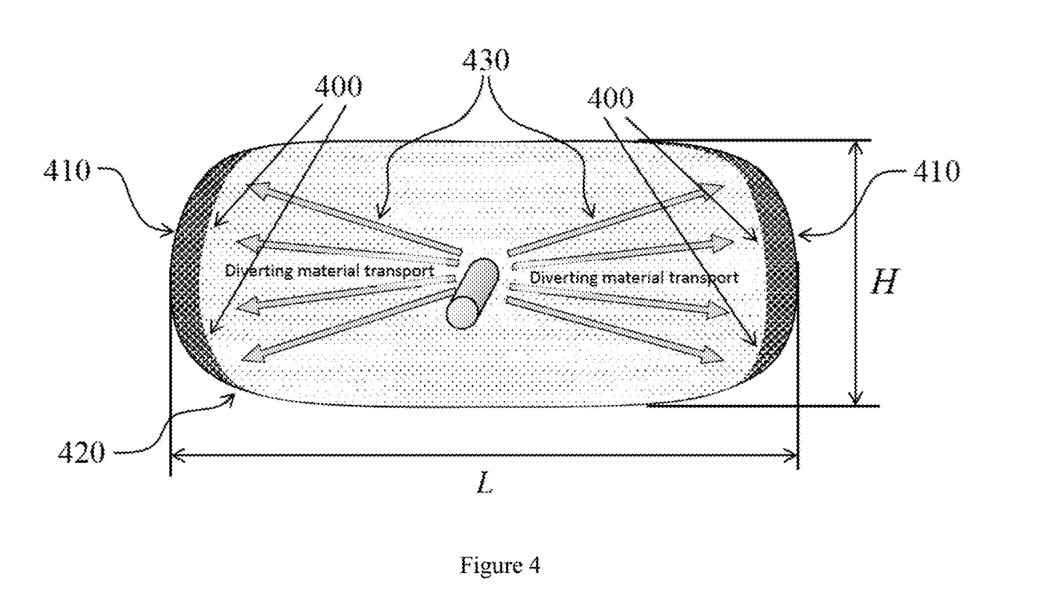

In yet another embodiment, the diverting material transport 430 that includes at least a bridging material may be placed non-uniformly towards the wings of a fracture, as seen in FIG. 4. FIG. 4 shows that upon bridging of the bridging material 400 along the wings 410 of the fracture 420 with the formation of a plug, growth of the fracture length may be restricted.

It is also envisioned that at least one diverting material transport may be introduced uniformly into a far field region. In such embodiments, the diverting material transport may include a plurality of bridging particles and/or fibers, where the bridging particles may have a monomodal or multimodal distribution. Referring now to FIG. 5, a uniform placement of a diverting material transport 520 into a fracture 510 is depicted. In such embodiments, the bridging material 500 may uniformly bridge at the tip of the fracture 510, restricting the growth of the fracture length and/or height.

According to the present embodiments, at least two bridging materials may be placed into a far field region. As noted above, the placement of the bridging materials is determined by the desired direction of growth restriction. In one or more embodiments, two bridging materials, such as a first and a second bridging material, may be placed uniformly, as seen in FIG. 6. In such embodiments, the two bridging materials may be introduced simultaneously or sequentially into the fracture.

FIG. 6 depicts the uniform placement of two diverting materials into a fracture 600, where a first and a second plurality of bridging materials are introduced sequentially. In such embodiments, a first diverting material transport that includes a first bridging material 610 is placed uniformly on the outer perimeter of a fracture 600. The first bridging material 610 may bridge near the fracture tip with the formation of a plug. In such embodiments, the first bridging material may be a large proppant. The size of the bridging material may be 100 mesh or $40/70$, or $30/50$ or $20/40$ or $16/30$ or $16/20$. Fibers may be added to first bridging material 610 (such as a proppant) for better transport but are not required. The second bridging material 620 (such as for example cellulose fibers dispersed in a carrier fluid) may be transported towards the fracture tip and may accumulate on the surface of the bridge formed by the first bridging material 610, with the formation of a low permeability plug which has high resistance to the fluid flow. As fluid can no longer flow into fracture, the fracture extension is restricted. Such embodiments may include more stages of diversion if desired (not shown). In embodiments when the first bridging material is sand and the second bridging material is a plurality of fibers, the fibers may be introduced in an amount of 5-100 less than the amount of sand.

According to the present embodiments, the concentration of the fibers pumped in this stage of the fracturing operation may be varied within the limits of 0.1-1000 ppt. In such embodiments, the fiber material may be any polymeric fiber. The amount of the fibers pumped during this stage may be varied within the range of 10-30 000 lb. The first and the second stage of the fracturing operation may be pumped sequentially, one after another, or may be spaced with clean fluid or with a proppant laden stage. According to the present embodiments, the first stage may be pumped at the beginning of the pad, during the pad or after the pad.

In such embodiments the first bridging agent may be selected from the group of inert non-deformable bridging materials and the second bridging material may be selected from the group of naturally derived fibers such as cellulose fibers. The mechanism of restricting the growth of a fracture height and/or length when the two bridging materials, 610 and 620 are pumped sequentially into a far field region of a fracture 600 is depicted in FIG. 7. FIG. 7 shows the formation of the plug formed by the first bridging material 610 (such as bridging particles) on top of which the second bridging material 620 (such as fibers) accumulate with the formation of a low permeability plug 640. As described below in greater detail, the bridging particles 610 may provide effective bridging due to the large size of the particles, while the second bridging material may provide the formation of a layer with very low permeability to provide overall high resistance to the fluid flow, thus enabling effective far field diversion.

It is also envisioned that the first bridging material 610 may be intermingled with a first plurality of fibers 620 with the formation of a plug 650 as seen in FIG. 8. In such embodiments, the second bridging material 660 (such as a second plurality of fibers) may accumulate on the surface of the plug 650 formed by the first bridging material 610 and the first plurality of fibers 620 with the formation of a low permeability plug. In such embodiments, the first plurality of fibers 620 may be selected from the group of organic polymers. As noted above, the first bridging material 610 may have a size large enough to bridge the far field region. It is also envisioned that the first bridging material 610 may have a monomodal and/or multimodal distribution. In such embodiments, the first 620 and the second plurality of fibers 660 may be the same, having the same length and diameter, or may be different.

As noted above, it is also envisioned that the diverting materials may be pumped simultaneously and uniformly. In embodiments where a first bridging material and a second bridging material are introduced simultaneously into a fracture, they may intermingle with the formation of a bridge. This is exemplified in FIG. 5. In such embodiments, a first bridging agent and a plurality of fibers suspended in a carrier fluid are pumped into a far field region, being placed near the outer border (perimeter) of the growing fracture. The bridging fibers and the fibers intermingle with the formation of a plug. As noted above, the bridging particles may have a size big enough to bridge next to the fracture tip. In one or more embodiments, the bridging particles may have a multimodal distribution.

Figure 9:
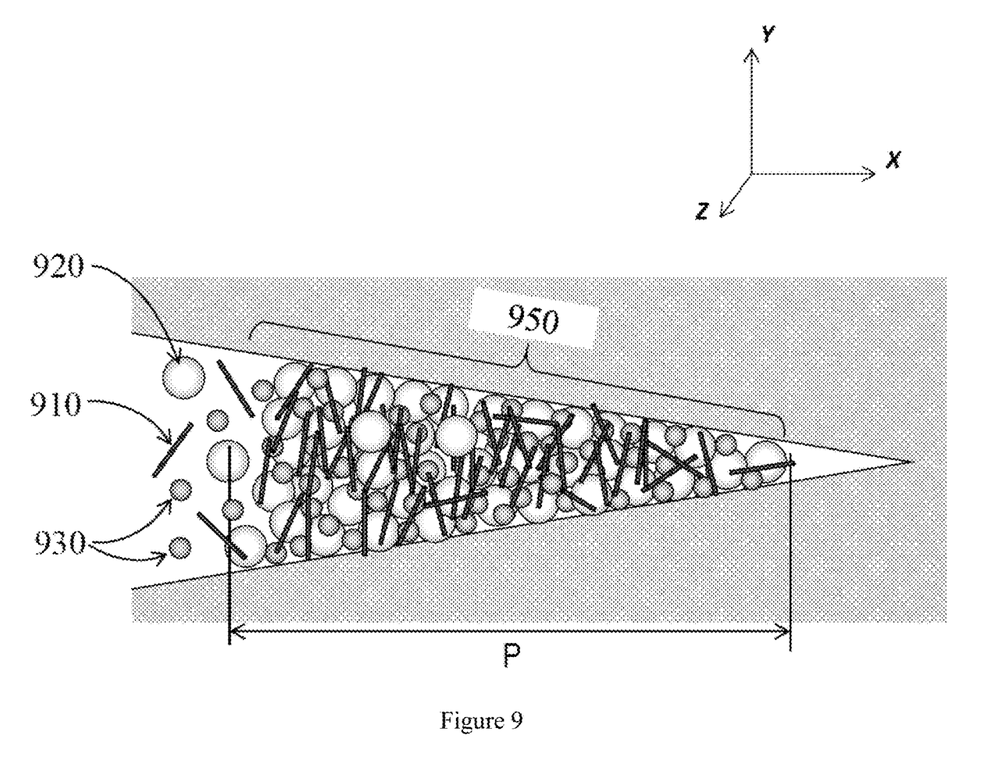

For example, in one or more embodiments, the bridging particles may have a bimodal distribution, as represented in FIG. 9. FIG. 9 represents the mechanism of bridging a far field region when a plurality of fibers 910 is intermingled with a bridging material that has a bimodal distribution (such as large and small bridging particles, 920 and 930, respectively). In such embodiments, the bridging materials may be pumped early in the proppant portion of the treatment. As these materials are transported through the fracture towards the narrower fracture widths, the larger particles will begin to bridge and the smaller particles will begin to pack off along with the fiber in a manner similar to filtration by a system of bridged particles. Fibers with small length may efficiently plug the pore space in the pack and may provide low permeability for the pack, thus enabling stop of fracture tip propagation.

Referring to FIG. 9, the fibers 910 transport the large and the small bridging particles 920, and respectively 930, towards the fracture tip with the formation of a low permeability plug 950. The fibers may also act as bridging and permeability reducing fibers.

It is also envisioned that at least one bridging material may be pumped not solely before the proppant stages, but after a portion of proppant is placed in the fracture. In one or more embodiments, there may be multiple portions of bridging material pumped during one stage of fracturing, altered with portions of proppant or clean fluid in between them in any combinations.

One embodiment of the present disclosure involves a method of hydraulically fracturing a subterranean formation penetrated by a wellbore. In such an illustrative embodiment, the method includes pumping a fracturing pad fluid into the subterranean formation under conditions of sufficient rate and pressure to create at least one fracture in the subterranean formation. As noted above, the fracturing pad fluid may include a carrier fluid and a plurality of bridging particles, where the bridging particles may form a bridge at a far field fracture tip. Afterwards, a first plurality of fibers is pumped into the subterranean formation to form a low permeability plug with the bridging particles. Next, a proppant fluid comprising a plurality of proppant particles may be pumped. In one or more embodiments, the fracturing pad fluid may include the first plurality of fibers such that the first plurality of fibers is intermingled with the bridging particles to form the bridge. In such embodiments, the first plurality of fibers may be pumped sequentially after the bridging particles such that the first plurality of fibers may form a deposit on the bridge.

It is also envisioned that the fracturing pad fluid may further include a second plurality of fibers such that the second plurality of fibers are intermingled with the bridging particles to form the bridge on which the first plurality of fibers are deposited. In such embodiments, the second plurality of fibers may be added in a concentration of 0.1 to 600 ppt. As noted above, the plurality of bridging particles and the first plurality of fibers may be introduced in the subterranean formation in such a manner to control a height and/or length of the at least one fracture formed in the subterranean formation.

Another embodiment involves a method of treating a subterranean formation zone that is substantially distanced from a wellbore. In such an illustrative embodiment, the method includes pumping a plugging slurry into a far field region of a treatment zone of the subterranean formation, pumping a first plurality of fibers into the far field region to form a low permeability plug with the plurality of bridging particles, pumping a proppant fluid into the far field region of the treatment zone of the subterranean formation, wherein the proppant fluid comprises a plurality of proppant particles and continuing pumping the proppant fluid into the far field region until a fracture network forms. In such embodiments, the plugging slurry may include a carrier fluid and a plurality of bridging particles having a particle size sufficient to control a geometry of at least a fracture in a far field region. According to the previous embodiments, the bridging particles and the proppant particles may be selected from the group of sand and ceramic proppants. For example, the size of the bridging particles used in the pad stage may be greater or equal to the size of the proppant particles used in the proppant stage. In one or more embodiments, the fracturing pad fluid may include the first plurality of fibers such that the first plurality of fibers are intermingled with the bridging particles to form the bridge. In yet another embodiment the first plurality of fibers are pumped sequentially after the bridging particles such that the first plurality of fibers form a deposit on the bridge. It is also envisioned that the fracturing pad fluid may further include a second plurality of fibers such that the second plurality of fibers are intermingled with the bridging particles to form the bridge on which the first plurality of fibers are deposited. In such embodiments, the plugging slurry may have a viscosity of at least 4 cP at 511 s$^{-1}$. It is also envisioned that the treating method may further include pumping a diversion fluid, where the diversion fluid is pumped during the proppant stage. It is also contemplated that a fluid carrying the bridging particles/fibers may have a significantly higher viscosity than the pad fluid.

In all the above embodiments, the total amount of fibers used, such as the first and the second plurality of fibers may range from about 100 to 10,000 lbs.

EXAMPLE

The following example is presented to further illustrate the preparation and properties of the fracturing fluids of the present disclosure and should not be construed to limit the scope of the disclosure, unless otherwise expressly indicated in the appended claims.

Many fracturing fluids use polyacrylamide as friction reducer or viscosifier. Polyacrylamides are negatively charged long polymers. In contact with cationic compounds, they tend to form polyelectrolyte complexes which can have solid forms. 0.6 vol % of polyacrylamide was mixed into 100 mL of tap water for 10 minutes in a laboratory Waring blender and placed in a Petri dish. Droplets (total of 0.6 mL) of a solution of 50% alkyl dimethyl benzyl ammonium chloride (ADBAC) were dropped in the Petri dish and the Petri dish was carefully agitated by hand to provide some mixing. Rapidly, a strong white and stringy precipitate formed from the reaction of anionic polymer and cationic surfactant.

To assess the performance of such polyelectrolyte complexes as far filed diversion materials, their ability in altering the permeability of a proppant pack was tested. A tube 1001 (FIG. 10) was filled with proppant 1002 and topped with water 1003. A 100-mesh screen 1004 was placed at the bottom of the tube. Two marks were drawn on the tube, the volume between which corresponds to 400 mL. A timer was used to measure the time it took for the fluid top to move between the two marks, thus corresponding to the time it took for 400 mL of clear water to flow through the proppant pack. Two tests with water were run showing good repeatability (4 min 6 s and 4 min 3 s).

Figure 10:
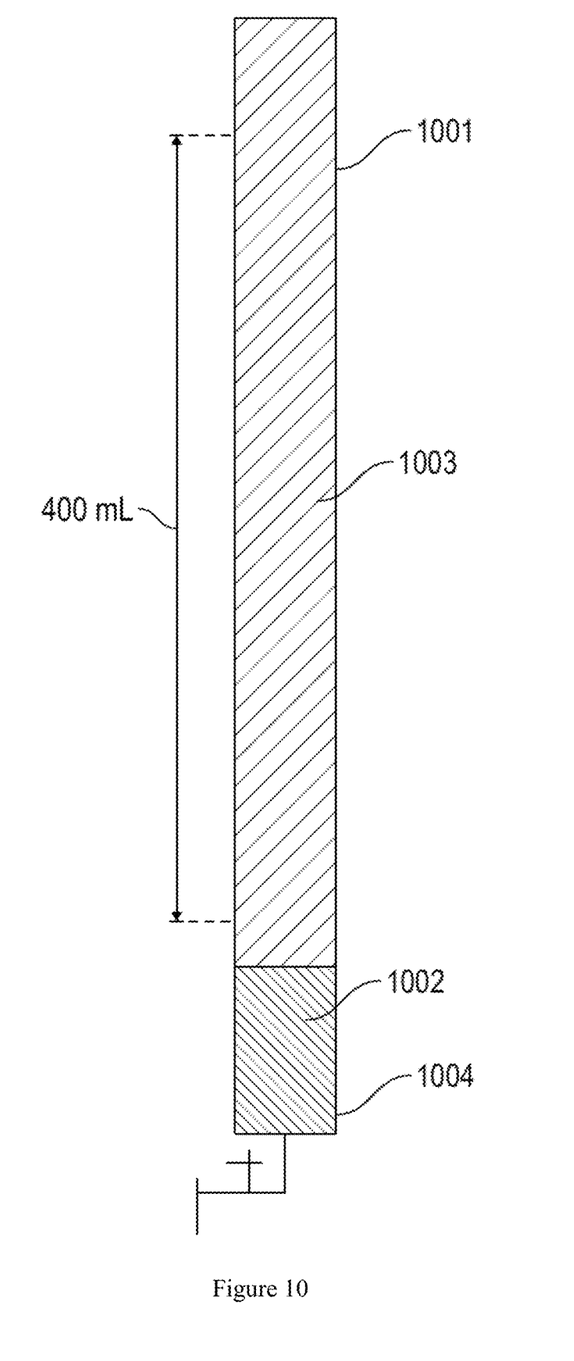
FIG. 10 shows a setup for measuring permeabilities of the packs of diverting materials according to the present embodiments.

Some polyelectrolyte complexes were formed in the tube by adding alternately a solution of anionic polyacrylamide (0.6 vol %) and drops of ADBAC (50%). The total amount of fluid added was 100 mL. The fluid was topped with clear water and the bottom valve was turned open. The polyelectrolyte complex flowed to the proppant pack and formed a thin filter cake. The flow rate dropped as the polyacrylamide flowed through the proppant pack, because of the viscosity of the fluid. After a few minutes, the flow rate increased as the clear water displaced the viscous fluid. 400 mL of clear water was flowed to make sure all viscous fluid was removed from the pack. A thin white filter cake could be seen at the top of the proppant pack. A flow measurement then showed a time of 15 min 50 s to flow 400 mL of clear water through the pack, almost 4 times more than the baseline. This result shows that the polyacrylate complex restricted the flow through the proppant pack by forming a filter cake and possibly damaging the proppant pack.

The polyelectrolyte complex dissolved in presence of saline water. This material is thus degradable under downhole conditions in contact with formation or flowback water.

Although the preceding description has been described herein with reference to particular means, materials, and embodiments, it is not intended to be limited to the particulars disclosed herein; rather, it extends to all functionally equivalent structures, methods and uses, such as are within the scope of the appended claims.

The invention claimed is:

1. A method comprising:
pumping a fracturing pad fluid into a wellbore traversing a subterranean formation under conditions of sufficient rate and pressure to create at least one fracture in the subterranean formation;
pumping a treatment fluid into the subterranean formation to mix with the fracturing pad fluid, the treatment fluid comprising a plurality of bridging particles coated with one or more polymers, wherein the bridging particles form a bridge at a fracture tip within a far field region of the subterranean formation; and
adjusting at least one parameter of the treatment fluid being mixed with the fracturing pad fluid, thereby causing the one or more polymers to form a first plurality of fibers in situ, wherein the first plurality of fibers form a plug with the bridging particles.

2. The method of claim 1, wherein the fracturing pad fluid comprises a second plurality of fibers that intermingle with the plurality of bridging particles to form a bridge on which the first plurality of fibers are deposited.

3. The method of claim 2, wherein the second plurality of fibers comprises cellulose fibers, or cellulose derivative fibers, or both.

4. The method of claim 1, wherein the one or more polymers are encapsulated.

5. The method of claim 1, wherein the one or more polymers are released from respective surfaces of the plurality of bridging particles via a time-based trigger, a temperature-based trigger, a pressure-based trigger, or a mechanical stress-based trigger, or a combination thereof.

6. The method of claim 1, further comprising pumping a proppant fluid comprising one or more proppant particles.

7. The method of claim 6, wherein pumping the proppant fluid comprises pulse fracturing.

8. The method of claim 1, wherein the at least one parameter of the treatment fluid is adjusted before the treatment fluid is pumped into the wellbore or after the treatment fluid is pumped into the wellbore.

9. The method of claim 1, wherein adjusting the at least one parameter of the treatment fluid comprises exposing the treatment fluid to a shear event.

10. The method of claim 9, wherein the shear event has a shear rate between about $1$ $s^{-1}$ and $100,000$ $s^{-1}$.

11. The method of claim 1, wherein the at least one parameter comprises a temperature of the treatment fluid, an ionic concentration of the treatment fluid, a pH of the treatment fluid, an exposure to shear by the treatment fluid, a hydrophobicity of the one or more polymers in the treatment fluid, a solvent composition of the treatment fluid, a crosslinking of the one or more polymers in the treatment fluid, or an average molecular weight of the one or more polymers in the treatment fluid, or a combination thereof.

12. The method of claim 1, wherein the one or more polymers comprises an organic polymer.

13. The method of claim 1, wherein the one or more polymers comprises a polyelectrolyte polymer.

14. The method of claim 1, wherein the one or more polymers comprises a crosslinkable polymer.

15. The method of claim 1, wherein the one or more polymers comprises a pH-sensitive polymer.

16. The method of claim 1, wherein the one or more polymers comprises at least two oppositely charged polyelectrolyte polymers.

17. The method of claim 16, wherein the at least two oppositely charged polyelectrolyte polymers consolidate to form a polyelectrolyte complex.

18. The method of claim 17, wherein the polyelectrolyte complex is dissolved or degraded by contacting saline formation water.

19. The method of claim 1, wherein the one or more polymers comprises at least one polyelectrolyte polymer and at least one oppositely charged surfactant.

20. The method of claim 19, wherein the at least one polyelectrolyte polymer comprises polyacrylamide.

* * * * *